United States Patent
Cortner

[11] 3,763,829
[45] Oct. 9, 1973

[54] CAGE-TYPE LIVESTOCK DUSTER
[75] Inventor: William C. Cortner, Kansas City, Mo.
[73] Assignee: Alley-Johnson Company, Kansas City, Mo.
[22] Filed: Sept. 3, 1971
[21] Appl. No.: 177,570

[52] U.S. Cl. ............................................. 119/159
[51] Int. Cl. ............................................. A01k 29/00
[58] Field of Search ..................... 119/159, 160, 156

[56] References Cited
UNITED STATES PATENTS
| | | | |
|---|---|---|---|
| 974,252 | 11/1910 | Fish | 119/159 |
| 2,571,536 | 10/1951 | Bush | 119/159 |
| 2,976,842 | 3/1961 | Hagar | 119/159 |

Primary Examiner—Hugh R. Chamblee
Attorney—Cushman, Darby & Cushman

[57] ABSTRACT

A cage-type livestock duster including a horizontally disposed ring arranged for suspension from a single point above the livestock area by plural flexible chains. The single point may be resiliently attached to a fixed member by a spring. From the ring plural rigid rods depend and join to support a bumper bar parallel to the ground of the livestock area. In one embodiment, powder or dust, which may be used, for instance, as a disinfectant, is enclosed in a conventional dust bag of the type known in the livestock dusting art and this bag is encircled by the ring which acts as a bumper ring against the bag when livestock moves the bar. In another embodiment, the dust or powder is enclosed in a flat top dust receptacle attached at its periphery to a suspended ring. In this embodiment when livestock bumps the parallel bar, the receptacle is jarred and dust is sifted therefrom in a manner similar to a flour sifter. The flat top dust receptacle may have single or multiple compartments with a top zipper over each for ready filling with the same or different type dust.

14 Claims, 4 Drawing Figures

CAGE-TYPE LIVESTOCK DUSTER

BACKGROUND OF THE INVENTION

1. Field of the Invention

The present invention relates to an apparatus for the application of a dust or powder to animals for disinfectant or other purposes and, more particularly, to a caged duster arranged to be suspended above a livestock area and actuable by the livestock to dust them with the powder or dust.

2. Description of the Prior Art

The provision of apparatus for dusting livestock with powder or dust is well known in the art of animal husbandry. Most of the prior arrangements provide for a bag disposed above the livestock area. When an animal comes into contact with this bag, as when the animal is forced between two posts, the bag is jarred by this contact and disinfectant powder or dust is dispensed through the loose fabric surface of the bag. Such an arrangement has the inherent disadvantage that agressive animals such as hogs, are apt to destroy the dust bag since it is disposed within their reach.

Another disadvantage of the prior art is that there is no provision for dusting a plurality of animals which may have a widely varying height. In other words, if the dust bag is suspended low enough to touch the shortest animal it will be well within the reach of the teeth or beak of the tallest animals and thus more likely to suffer damage therefrom. The same type damage potential is also present, of course, if the bag is suspended low enough to be reached by any of the animals. Furthermore, when the bag can be directly contacted physically by animals, the dust pores of the bag are much more suceptible of ready clogging due to the dirt, moisture and the like from the animals.

A partial solution to the above-discussed problems is taught by the U.S. Pat. to Fish, No. 974,252, issued Nov. 1, 1910. The Fish patent shows a dusting container suspended above the livestock area, in this case a poultry run, with agitator arms depending therefrom into the area for contact by the poultry. Inside the dust bag is a perforated base board which rests on the horizontally disposed heads that pass through the bag and become the depending agitator arms. Movement of the depending arms by a fowl causes a pivotal movement of the associated heads. Upon release of the arms, i.e., when the fowl moves past the arms, the heads snap back into horizontal position so as to jar powder through the perforations in the base board and to sift it through the bag bottom onto the fowl. While, as stated above, the Fish patent presents a definite advance over the prior art, it, nevertheless, is subject to several inherent disadvantages. For example, in the Fish patent, the depending arm must be pivoted and then released before any dusting will take place.

Therefore, to avoid the possibility that an animal will move beyond the dusting area before the powder descends to its level, a plurality of arms are required. In addition, since the arms only operate the bag, if an animal passes the bag in a certain direction, the animals must be carefully confined between the sides of the box.

Thus, the Fish device would not be applicable in an environment which does not include a means such as a corral for restraining animal movements.

SUMMARY OF THE INVENTION

In view of the above-recited disadvantages of the prior art, it is the object of the applicant's invention to overcome all of those disadvantages by providing a cage-type livestock duster which may be suspended above the livestock area and which is actuable by a means depending into the animal area which can be actuated by animal contact from any direction. In addition, it is an object of this invention to provide an animal duster of the above type which is simple and rugged in construction.

These and other objects are achieved by the applicant's invention which in the preferred embodiments include a horizontally disposed ring which may be flexibly suspended above the livestock area and has a plurality of rods firmly attached thereto and depending into the livestock area where the rods join and firmly support a horizontally disposed bite bar. The ring, in response to animal movement of the bite bar and rods, acts as a mechanical agitator for the powder or dust in a container associated with the ring.

In a first embodiment, the dust is contained within a dust bag which is suspended within the ring and is bumped thereby when the animals move the bite bar a sufficient distance. In a second embodiment, the dust is contained within a relatively flat dust sifting receptacle which is arranged within the ring in a drum-like manner. The dust receptacle in this embodiment is preferably detachably secured to the ring. In both embodiments the means whereby the ring is suspended may in turn be connected to a fixed position through a resilient spring which adds a vertical oscillatory motion to the disinfectant container when the livestock contacts the bite bar to aid in the sifting of disinfectant powder from its container.

BRIEF DESCRIPTION OF THE DRAWINGS

FIG. 3 is a partial cross-sectional view through the FIG. 2 ring and dust receptacle substantially along the lines 3—3;

FIG. 4 is a top view of another embodiment of a dust receptacle for use with the embodiment shown in FIG. 2.

DETAILED DESCRIPTION OF THE PREFERRED EMBODIMENTS

Figure 1:
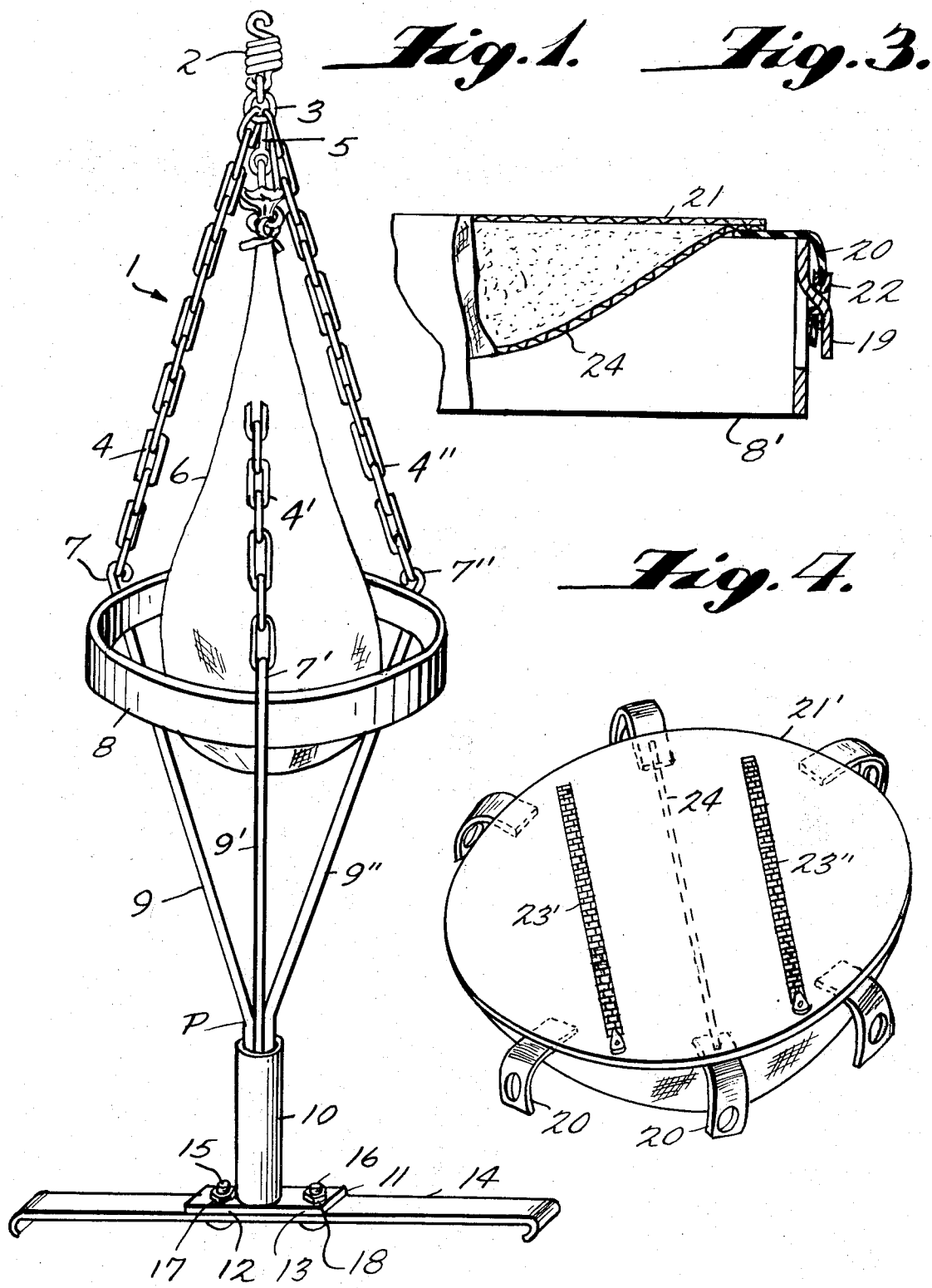
FIG. 1 is a perspective view of a first embodiment of a cage-type livestock duster in accordance with applicant's invention.

The reference number 1 in FIG. 1 refers generally to one embodiment of the cage-type livestock duster contemplated by this invention. The duster 1 is adapted to be suspended above the livestock pen or other treatment area by means of a spring 2 which is connected at the top end to a fixture (not shown) and at the bottom end to the ring 3. The ring 3 supports in common the flexible chains 4, 4' and 4'' and the dust bag support rope 5.

The dust bag support rope 5 in turn supports a dust receptacle which takes the form of a generally pear-shaped dust bag 6 while the chains 4, 4' and 4'' are fixedly attached by hooks 7, 7' and 7'', respectively, which are welded to the bumper ring 8. It is noted that the flexible chains 4 through 4'' support the ring 8, flexibly i.e., the ring 8 is supported so that it responds to a force from any direction by a movement in the opposite direction. Bumper ring 8 encircles the dust bag 6 at the area of the bag's greatest volume.

The dust bag 6 contains disinfectant dust or the like and is manufactured from a fabric which may be of loosely woven burlap having a mesh size such that it will contain the dust until it is mechanically agitated or jarred at which time it will release a certain amount of dust. Conventional dust bags may be employed, or alternatively bag 6 may be made from materials as in my copending application Ser. No. 110,575, filed Jan. 28, 1971.

From the bumper ring 8, rigidly rods 9, 9' and 9" which may be extensions of hooks 7 through 7" rigidly depend. The rods 9, 9' and 9" contact the bumper ring 8 at equal angular displacements on its periphery and are also welded thereto as are the hooks 7 through 7". In other words, the angular displacement between each chain with respect to the other chains and each rod with respect to the other rods along the circumference of the bumper ring 8 is 120°.

The rods 9 through 9" converge towards one another until they reach point P from which they downwardly extend parallel to each other and vertically depend through pipe 10 into the livestock area. The rods 9 through 9" are welded to each other and tee pipe 10 while the pipe 10 is welded at its lower end to a junction plate 11 which contains apertures 12 and 13.

A horizontally disposed "bite" bar 14 is connected to the junction plate 11 by means of bolts 15 and 16 which are inserted through respective apertures 12 and 13 in the bar 14 and plate 11. The bolts 15 and 16 are then secured by nuts 17 and 18.

The bar 14 is suspended at a level such that the shortest animal will contact it while the rods 9 through 9" are long enough to keep the dust bag out of the reach of the tallest animal.

In operation, when an animal contacts the bar 14 by biting or brushing against it, as in the case of taller animals, the bumper ring 8 is brought into physical contact with dust bag 6 jarring the dust bag and thereby forcing egress of a certain amount of dust therefrom. In addition, a vertical oscillatory motion is produced with respect to the dust bag 6 because of the spring 2 which aids in the transport of powder from the dust bag.

Figure 2:
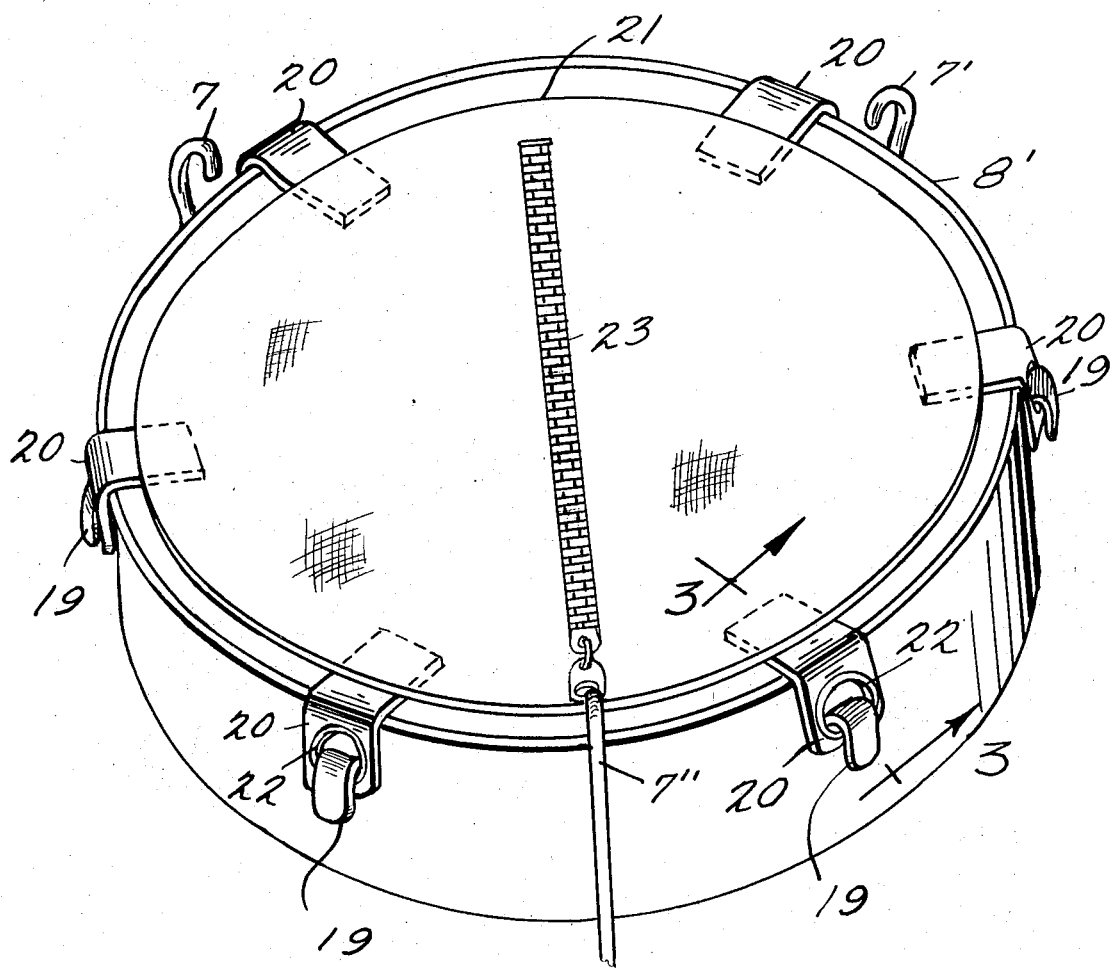
FIG. 2 is a perspective view of another embodiment of applicant's cage-type livestock duster.

FIG. 2 shows a second embodiment of applicant's invention. Instead of a separately supported dust bag 6, FIG. 2, shows a flat top dust receptacle or filter cartridge 21 which is preferably detachably secured to the modified ring 8'. Except for filter cartridge 21 and modifications of the ring 8', the remainder of the cage-type livestock duster is as described with respect to FIG. 1 and thus is not shown or described with respect to FIG. 2.

A plurality of hook type fasteners 19 which may be punched from ring 8' are spaced therearound and curl outward and downward therefrom. A corresponding plurality of stretchable mounting tabs 20 sewn or otherwise secured to the periphery of dust receptacle 21 at points corresponding to the hooks 19 and extend from the receptacle over the top of ring 8'.

The outer ends of tabs 20 contain grommets 22 which are hooked over hooks 19 to support the dust receptacle 21 in a drum-like manner within the ring 8'. The tabs 20 are flexible enough to stretch over the ring and attach to the fasteners. However, the tabs should not be so flexible as to absorb all of the vibrations created when the ring 8' is agitated. The dust receptacle 21 has, along its top surface, a symmetrically disposed zipper 23 which may be open for inserting disinfectant dust or the like.

FIG. 4 shows a modified dust receptacle 21' which has the same size and shape as dust receptacle 21 but which is symmetrically divided into two completely separate compartments by seam 24. Each of the portions has its own zipper 23' and 23", respectively, whereby different dusts or powders can be placed in each compartment to simultaneously treat livestock for a plurality of parasites or diseases.

Both of the receptacles 21 and 21' have at least a fabric bottom 24 which is designed to release dust in a manner similar to the release of flour from a flour sifter when the bumper ring 8' is actuated following the contact of an animal with the bar 14 or pipe 10.

Of course, when the dust is sufficiently depleted either of the receptacles 21 or 21' may be easily replaced by new dust receptacles. Alternatively, the dust receptacle can be refilled through the openings controlled by the zippers 23 through 23" while the dust receptacle remains attached to the ring 8'.

While the above description covers the preferred embodiments, it should be obvious to one skilled in the art that many modifications may be made within the scope of applicant's invention. Thus, for example, the ring 3 may be replaced by a chain or other adjustable support means so that the cage-type livestock duster may be adjusted to different heights for treating different types of livestock. Additionally, other means for fasting the filter cartridges 21 or 21' than the hooks 19 and elastic tabs 20 may be employed. For example, the framing ring 8 may have added to it a plurality of internal, upstanding threaded and shouldered studs over which grommeted apertures in the edge of the filter cartridge are disposed and the cartridge secured thereto by nuts on the studs. Other modifications obvious to one skilled in the art are likewise included in the following claims.

What is claimed is:

1. A duster for given livestock comprising:
   mechanically agitating means,
   means for flexibly suspending said agitating means above a livestock area out of the reach of said given livestock,
   actuating means rigidly depending from said agitating means to the general level of said livestock and movable in any direction by said livestock for actuating said agitating means when so moved,
   receptacle means for releasably containing dust, and
   means for suspending said receptacle means adjacent said agitating means to cause dust to be released from said receptacle means upon mechanical agitation of said receptacle means by said agitation means when said livestock moves said actuating means in any direction as aforesaid.

2. The livestock duster of claim 1 wherein said dust receptacle means comprises a fabric dusting bag suspended by said flexible suspending means to the level of said agitating means, and wherein said agitating means comprises a bag bumper ring encircling a portion of said bag, said ring being firmly secured to said actuating means so that when said actuating means is moved by said livestock said bumper ring bumps said bag to release dust therethrough.

3. The livestock duster of claim 2 wherein said actuating means comprises rod means depending from said bumper ring to said livestock level.

4. The livestock duster of claim 3 further including horizontally disposed bar means attached to the bottom of said rod.

5. The livestock duster of claim 1 wherein said flexible suspending means includes flexible chain means.

6. The livestock duster of claim 1 wherein said flexible suspending means includes resilient means for imparting to said agitating means an oscillatory motion when actuated by said actuating means.

7. The livestock duster of claim 1 wherein said agitating means and said receptacle means are both adjustably suspended above said livestock area.

8. The livestock duster of claim 1 wherein said dust receptacle means comprises a horizontally disposed dust receptacle with a dust sifting bottom, and said agitating means comprises a ring to which said receptacle means is attached so that dust may be sifted through said receptacle bottom when said actuating means is moved by said livestock to cause agitation of said receptacle.

9. The livestock duster of claim 8 wherein said ring includes a plurality of fastening means and said dust receptacle includes at its periphery, and is attached to said ring by, a plurality of elastic tabs each of which contains a grommet which cooperates with a respective one of said fasting means located on said ring so that said dust receptacle can be easily removed from said ring.

10. The livestock duster of claim 8 wherein said dust receptacle includes at least one zipper located in the top thereof for permitting said dust receptacle to be refilled with dust while it remains attached to said ring.

11. The livestock duster of claim 8 wherein said dust receptacle includes at least one divider means which divides said dust receptacle into plural compartments, each said compartment including a respective zipper located in the receptacle top thereof for dispensing a plurality of dust types.

12. In a cage-type duster for animals especially aggressive animals such as hogs that may destroy reachable dusting containers, the improvement comprising:
means for surrounding a said dusting container to effect mechanical agitation of said dusting container when actuated,
means for suspending said agitating means at a desired height above said animals,
fastening means for disposing said dust container adjacent to and inside of said agitation surrounding means, and
actuating means depending from said surrounding means to the general level of said animals for movement thereby to effect said agitation by actuation of said surrounding means.

13. A cage-type duster for animals especially aggressive animals such as hogs that may destroy reachable dusting containers, comprising:
means for surrounding a said dusting container to effect mechanical agitation of said dusting container when actuated,
means for suspending said agitating means at a desired height above said animals,
fastening means for disposing said dust container adjacent to and inside of said agitation surrounding means,
actuating means depending from said surrounding means to the general level of said animals for movement thereby to effect said agitation by actuation of said surrounding means, and
further including said dust container, said container being a dusting bag and said fastening means including means for hanging said bag so that at least a lower part of the bag is surrounded by said agitation surrounding means.

14. A cage-type duster for animals especially aggressive animals such as hogs that may destroy reachable dusting containers, comprising:
means for surrounding a said dusting container to effect mechanical agitation of said dusting container when actuated,
means for suspending said agitating means at a desired height above said animals,
fastening means for disposing said dust container adjacent to and inside of said agitation surrounding means,
actuating means depending from said surrounding means to the general level of said animals for movement thereby to effect said agitation by actuation of said surrounding means, and
further including said dust container, said container being a substantially flat top receptacle having a dust releasable bottom when jarred, said receptacle having a closable access area for insertion of dust for said animals, and said fastening means cooperating with said receptacle and agitation surrounding means to detachably secure the same together around said surrounding means so that animal movement of said actuation means causes sufficient jarring of said receptacle by said agitation surrounding means to effect dusting of the animal causing such movement.

* * * * *